United States Patent
Heitz

(10) Patent No.: US 9,133,772 B2
(45) Date of Patent: Sep. 15, 2015

(54) FUEL SYSTEM

(75) Inventor: Steven A. Heitz, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 474 days.

(21) Appl. No.: 13/033,706

(22) Filed: Feb. 24, 2011

(65) Prior Publication Data

US 2012/0219429 A1 Aug. 30, 2012

(51) Int. Cl.
- F04B 49/20 (2006.01)
- F02C 9/26 (2006.01)
- F02C 9/30 (2006.01)
- F04B 49/22 (2006.01)

(52) U.S. Cl.
CPC . *F02C 9/263* (2013.01); *F02C 9/30* (2013.01); *F04B 49/20* (2013.01); *F04B 49/22* (2013.01); *F05D 2270/71* (2013.01)

(58) Field of Classification Search
CPC .............. F02C 9/30; F02C 7/22; F02C 9/263; F04B 49/20; F04B 49/22; F04B 49/24
USPC .................. 417/26, 364, 428; 244/135 R; 137/115.26
See application file for complete search history.

(56) References Cited

U.S. PATENT DOCUMENTS

| | | | |
|---|---|---|---|
| 3,601,506 A * | 8/1971 | Griswold | 417/266 |
| 4,118,148 A * | 10/1978 | Allen | 417/12 |
| 4,182,354 A * | 1/1980 | Bergstedt | 137/10 |
| 4,648,322 A | 3/1987 | Heitz et al. | |
| 5,103,632 A | 4/1992 | Heitz et al. | |
| 5,795,998 A | 8/1998 | Smith | |
| 5,896,737 A | 4/1999 | Dyer | |
| 5,941,786 A | 8/1999 | Van Wijk et al. | |
| 6,170,470 B1 | 1/2001 | Clarkson et al. | |
| 6,810,674 B2 | 11/2004 | Clements | |
| 7,007,452 B1 | 3/2006 | Baryshnikov et al. | |
| 7,131,274 B2 | 11/2006 | Baryshnikov et al. | |
| 7,234,293 B2 | 6/2007 | Yates et al. | |
| 7,527,481 B2 | 5/2009 | Baryshnikov et al. | |
| 7,540,141 B2 * | 6/2009 | Goldberg et al. | 60/39.281 |
| 7,630,355 B2 | 12/2009 | Tao et al. | |
| 8,256,222 B2 | 9/2012 | Mahoney et al. | |
| 2005/0279079 A1 | 12/2005 | Baryshnikov et al. | |
| 2007/0017206 A1 | 1/2007 | Baryshnikov et al. | |
| 2010/0313849 A1 * | 12/2010 | Stoner et al. | 123/350 |

FOREIGN PATENT DOCUMENTS

| EP | 0886054 A2 | 12/1998 |
|---|---|---|
| EP | 0886054 B1 | 1/2004 |

OTHER PUBLICATIONS

Extended EP Search Report issued in EP12156746.5 on Dec. 12, 2013.

* cited by examiner

*Primary Examiner* — Devon Kramer
*Assistant Examiner* — Patrick Hamo
(74) *Attorney, Agent, or Firm* — Cantor Colburn LLP

(57) ABSTRACT

An aircraft engine fuel system is provided and includes a pump, including an inlet and an outlet, from which pressurized output is produced, a valve disposed downstream from the pump outlet to receive and to direct the pump output flow toward the engine and to provide a leak tight seal when the pump is not operating, a sensor configured to issue a signal reflective of a state of the valve at first and second conditions and a controller, operably coupled to the pump and the sensor, which is receptive of the signal and which modifies performance models of the pump and engine to control pump speed to modify pump flow accordingly.

4 Claims, 3 Drawing Sheets

FUEL SYSTEM

BACKGROUND OF THE INVENTION

The subject matter disclosed herein relates to a simplified fuel system and, more particularly, to an aircraft engine fuel system with a fuel metering pump and a fuel system with a pump capacity indicator and a controller which schedules fuel flow to an engine using data collected from the pump capacity indicator.

In modern high performance aircraft engines, internal structures may be cooled and lubricated by a circulating flow of oil, which is distributed and collected throughout the main engine structure. Meanwhile, thermal management methods include the rejection of heat from the circulating oil loops into the flow of fuel entering the engine combustion chamber. Here, the fuel flow is used as a recuperative heat sink which incurs few of the penalties of air cooling, but is limited in effectiveness by the maximum temperature tolerable by the fuel. Further effectiveness of using the flow of fuel, is the limitation necessitated by maintaining the fuel flow above freezing to minimize the possibility of ice formation and subsequent entry into sensitive areas such as engine actuators.

Main fuel pumps for aircraft engines have traditionally been fixed delivery, positive displacement type pumps connected mechanically to the rotating engine shaft. As the flow rate from a pump turning proportional to engine shaft speed cannot match the fuel flow requirements of a gas turbine engine operating under a variety of power levels, however, it became common to size the main fuel pump with an excess flow capacity under all engine operating conditions. The fuel systems, therefore, often include a fuel bypass for routing excess main fuel flow back to the low pressure side of the main pump.

The various components of the fuel bypass systems include a series of pumps and pressure regulating valves, such as a metering pump disposed upstream from a minimum pressure and shut off valve (MPSOV). Here, the metering pump produces output fuel at a predefined pressure to match the back pressure created by the fuel nozzles in the combustor. The MPSOV insures that the desired amount of this output fuel enters the engine and creates a leak tight seal when the engine is not in operation. The MPSOV is configured to maintain a constant pressure drop, which assures the pump discharge pressure is based on the engine combustor pressure.

BRIEF DESCRIPTION OF THE INVENTION

According to one aspect of the invention, an aircraft engine fuel system is provided and includes a pump, including an inlet and an outlet, from which pressurized output is produced, a valve disposed downstream from the pump outlet to receive and to direct the pump output flow toward the engine and to provide a leak tight seal when the pump is not operating, a sensor configured to issue a signal reflective of a state of the valve at first and second conditions and a controller, operably coupled to the pump and the sensor, which is receptive of the signal and which modifies performance models of the pump and engine to control pump speed to modify pump flow accordingly.

According to yet another aspect of the invention, an aircraft engine fuel system is provided and includes a pump, including an inlet and an outlet, from which pressurized output is produced, a valve disposed downstream from the pump outlet to receive and to redirect a predefined portion of the output toward an engine, a bypass conduit, which is fluidly coupled at an inlet thereof to the valve and at an outlet thereof to the pump inlet, by which a remaining portion of the output is able to be re-circulated to the pump inlet, a sensor to issue a signal reflective of a state of the valve at first and second conditions and a controller, operably coupled to the pump and the sensor, which is receptive of the signal and which controls the pump to modify performance models of the pump and engine to modify the output pressure accordingly.

According to yet another aspect of the invention, an aircraft engine fuel system is provided and includes a positive displacement pump, including an inlet and an outlet, from which pressurized output fuel is produced, a minimum pressure and shut off valve (MPSOV) disposed downstream from the pump outlet; a bypass and pressure regulating valve to receive and to redirect a portion of the output fuel toward an aircraft engine fuel flow inlet, a bypass conduit, which is fluidly coupled at an inlet thereof to the MPSOV and at an outlet thereof to the inlet, by which a remaining portion of the output fuel is able to be re-circulated to the inlet, a sensor to issue a signal reflective of a state of the bypass and pressure regulating valve at first and second conditions and a motor controller, operably coupled to the pump and the sensor, which is receptive of the signal and which controls the pump to modify performance models of the pump and engine to modify the output fuel pressure accordingly.

According to yet another aspect of the invention, an aircraft engine fuel system is provided and includes an engine driven pump, a pressure regulating valve (PRV) to receive fuel pumped from the engine driven pump and to direct the fuel to an engine fuel inlet, a current to pressure servo valve, whereby a change in a fuel flow rate to the engine fuel inlet occurs in accordance with a change in current applied to the current to pressure servo valve, a sensor to issue a signal reflective of a state of the PRV and a controller, operably coupled to the engine driven pump and the sensor, which is receptive of the signal and which controls the engine driven pump supply pressure accordingly.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
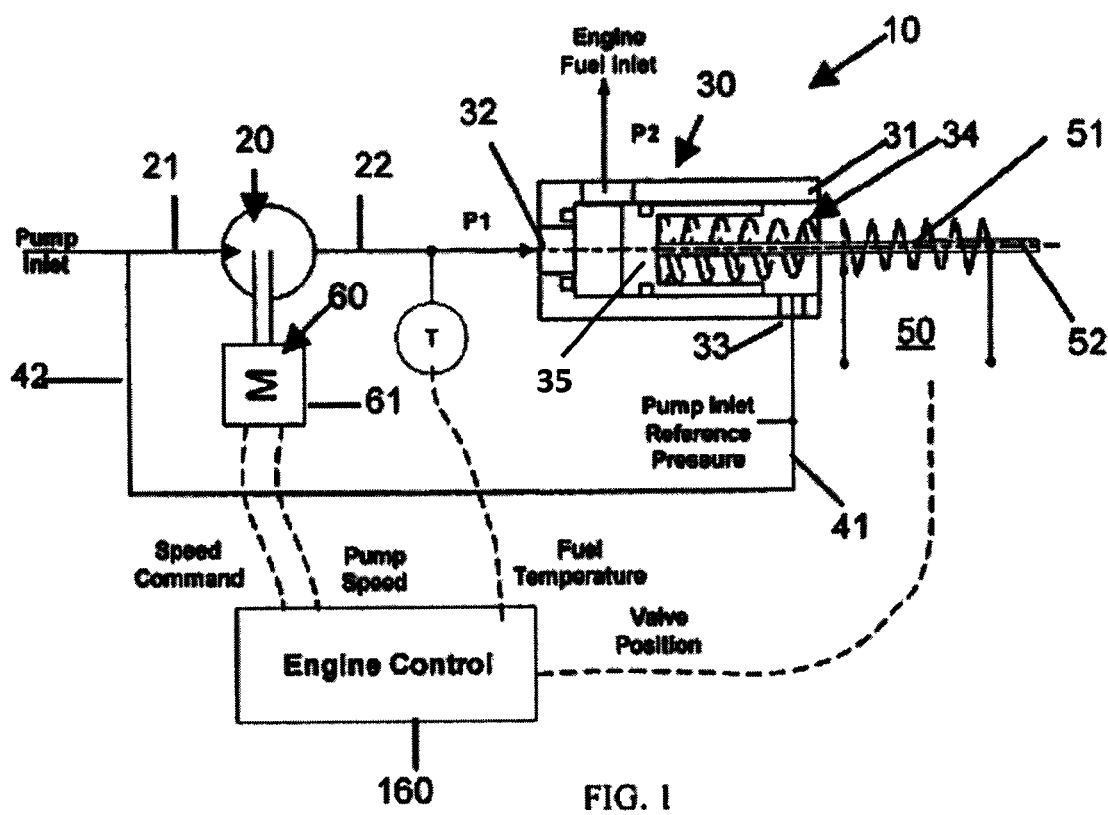
FIG. 1 is a schematic illustration of an engine fuel system with a minimum pressure and shutoff valve, MPSOV, which incorporates a pump capacity indicator and pump speed control.

In accordance with aspects of the invention and, with reference to FIG. 1, an aircraft engine fuel system 10 is provided and includes a pump 20, a valve 30, an inlet pressure sensing conduit 40, a sensor 50 and a motor controller 60.

The pump 20 may be a fixed displacement metering pump or a positive displacement pump, such as a fuel metering pump, which receives fuel from a fuel supply and provides a controlled amount of pressurized output fuel to an engine combustor. The pump 20 includes a pump inlet 21 and a pump outlet 22. The pump 20 provides for low fuel flow during low speed engine starting conditions with a fuel volume that is a function of the speed at which the pump 20 is rotating. The relation of the change in volumetric output for a change in pump speed is generally linear in nature. Pump internal leakage is dependent on pump internal clearances and the pressure rise. Within a small range of speed, pressure rise and temperature, such as at the engine starting condition, an accurate calibration of pump capacity, including internal leakage, can be determined and supplied to engine controller 160 to establish a map of pump discharge flow vs. speed, pressure rise and fuel temperature. Temperature corrections to the valve position sensing and pump performance are thus established with operational temperature input to the engine controller 160. The fuel temperature is used modify the control commands input to the pump 20 based of known characteristics of the pump, sensor and fuel.

The valve 30 may be a pressure regulating valve, such as a minimum pressure and shut off valve (MPSOV), and may include a valve case 31, which forms a valve inlet 32 and a valve outlet 33 and defines a valve interior 34, and a piston 35, which translates within the valve interior 34. The valve 30 is disposed downstream from the pump outlet 22 to receive and to redirect the output fuel toward a destination, such as a fuel flow inlet of an aircraft engine. The inlet pressure sensing conduit 40 includes an inlet 41 and an outlet 42 and is fluidly coupled at the inlet 41 to the valve 30 and at the outlet 42 to the pump inlet 21. The valve 30 is configured to maintain a constant pressure differential above the pump inlet pressure. As such, the pump back pressure follows the characteristic pressure and flow of the fuel nozzles in the engine combustor. When the pump 20 is not operating, the valve 30 (i.e., the MPSOV) provides a leak tight seal.

During operation, flow capacity of the pump 20 is proportional to the operating speed of the pump 20 once a correction for leakage flow is accounted for during engine startup. A mathematical representation of the pump and the pressure vs. flow characteristic of the engine may be used to schedule fuel flow to the engine. The engine controller 160 is used to create a pump motor speed command to produce the desired fuel flow in response to an engine throttle command from the aircraft.

The sensor 50 issues a signal that is reflective of a state of the valve 30 and, in particular, indicates when the valve 30 cracks. This signal can then be transmitted to the engine controller 160, which is operably coupled to the pump 20 by way of the motor controller 60 and the sensor 50. The engine controller 160 has performance models of fuel delivery systems and flow and pressure characteristics of the engine stored therein. The engine controller 160 is receptive of the signal and operably disposed to control the motor controller 60 to control the pump 20 to modify the output pressure accordingly. That is, a pump speed can be captured by the engine controller 160 when the valve 30 cracks, which is sensed by the sensor 50 based on the sensing of a mechanical response of, for example, the piston 35 of the valve 30. This pump speed can then be monitored with metered flow through the pump 20 being corrected based on pump wear. The pump wear is indicated by the sensor 50 based on the further sensing of additional mechanical responses of the piston 35.

The sensor 50 may be any type of sensor capable of sensing the mechanical response of one or more of the components of the valve 30. For example, the sensor 50 may include a Hall effect sensor or a Hall probe that has a sensing element 51 operably disposed on a drive shaft 52, which is integrally coupled to the piston 35. Thus, as the piston 35 translates axially, the drive shaft 52 translates similarly with respect to the sensing element 51.

The signal issued by the sensor 50 is comparable with the pump speed at which the pump 20 operates such that it is possible to check pump health and/or pump capacity during an operation of the fuel system 10. That is, pump health and/or pump capacity can be checked at an initial time (i.e., at engine startup) by comparing the pump speed with an initial type and/or amplitude of the mechanical response (i.e., a displacement of the piston 35). A similar comparison can be made at a later time such a maximum fuel flow command attained during aircraft take off. The valve position at this second condition may be compared with the valve position during engine startup and this comparison may be used to confirm that changes in the predicted fuel flow are associated with decreased pump capacity due to wear. A correction to the engine performance model is then made if the signals at different operating conditions are inconsistent with expectations of pump wear. That is, an increased pump speed at take off without a similar change at engine startup would indicate degradation of the engine performance, which requires fuel flow and pressure to be increased to achieve the desired engine performance. This information may also include health monitoring data for the pump 20 and engine and may be made available to indicate a need for engine maintenance.

In accordance with various embodiments, the motor controller 60 may be a variable speed electric motor 61. As such, the engine controller 160 may be able to instruct the motor controller 60 to drive the pump 20 with increased or decreased pump speed in accordance with a result of the sensing by the sensor 50. In some cases where the signal issued by the sensor is indicative of a cracked valve 30, the engine controller 160/motor controller 60 may also cause the pump 20 to simply shut down.

Figure 2:
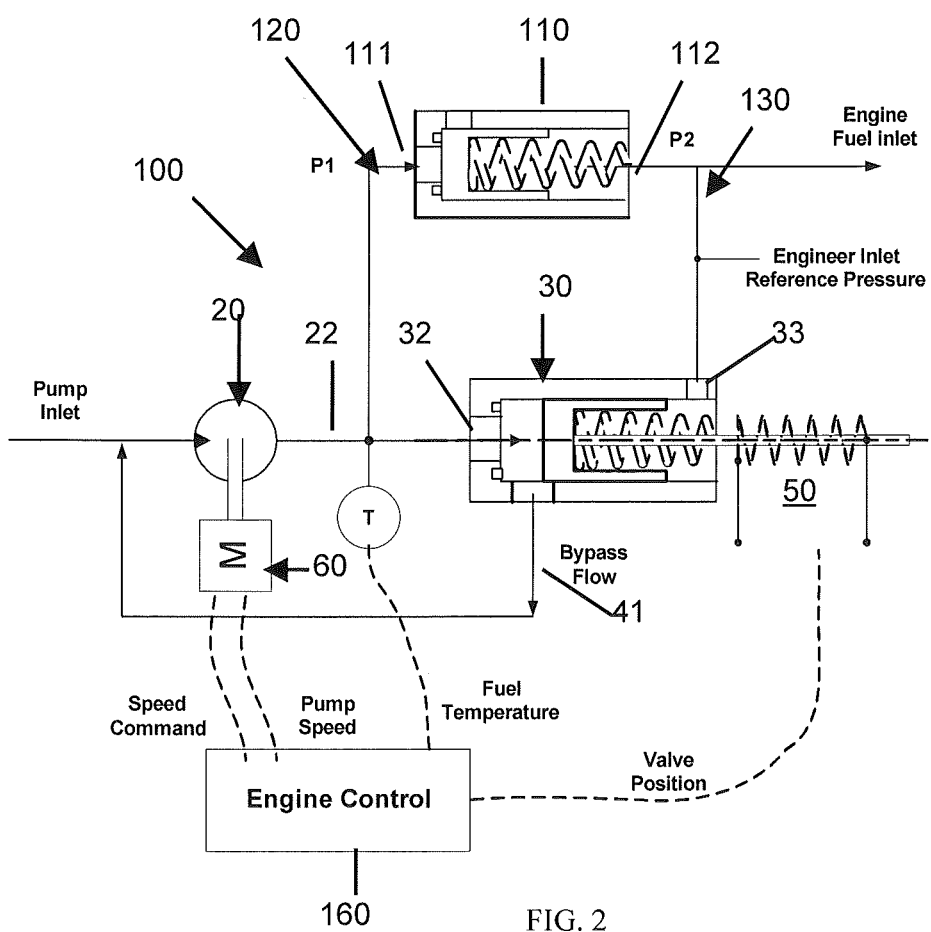
FIG. 2 is a schematic illustration of an engine fuel system with an MPSOV and a pressure regulating bypass valve which incorporates a pump capacity indicator and pump speed control.

In accordance with further aspects of the invention and, with reference to FIG. 2, a fuel system 100 is provided and includes similar features as described above, which will not be described again, as well as a valve 110, a bypass conduit 120 and a secondary conduit 130 to supply fuel to the engine. The valve 110 may be a fuel metering valve or an MPSOV and may include a valve inlet 111 at pressure P1, which is fluidly coupled to the bypass conduit 120, and a valve outlet 112 at pressure P2, which is fluidly coupled to the secondary conduit 130. The bypass conduit 120 is further fluidly coupled to the pump outlet 22 (i.e., a pump discharge outlet) and the secondary conduit 130 is fluidly coupled to the valve outlet 33 at a inlet reference pressure. The bypass conduit 41 is coupled to the valve 30 proximate to the valve inlet 32. With this arrangement, the pump 20 outputs fuel toward an engine fuel inlet by controlling the pressure differential between P1 and P2 as a commanded pump flow.

The signal issued by the sensor 50 is comparable with the pump speed at which the pump 20 operates such that it is possible to check pump health and/or pump capacity during an operation of the fuel system 100. That is, pump health and/or pump capacity can be checked at an initial time by comparing the pump speed with an initial type and/or amplitude of the mechanical response. A similar comparison can be made at a later time and any increase in pump speed can be evaluated for an indication as to whether it is associated with decreased pump capacity due to wear. An additional correction can also be made if the signals at different operating conditions are inconsistent with pump wear. This would indicate degradation of the engine performance which requires fuel flow and pressure to be increased to achieve the desired engine performance. This information may also be made available to indicate a need for engine maintenance.

Figure 3:
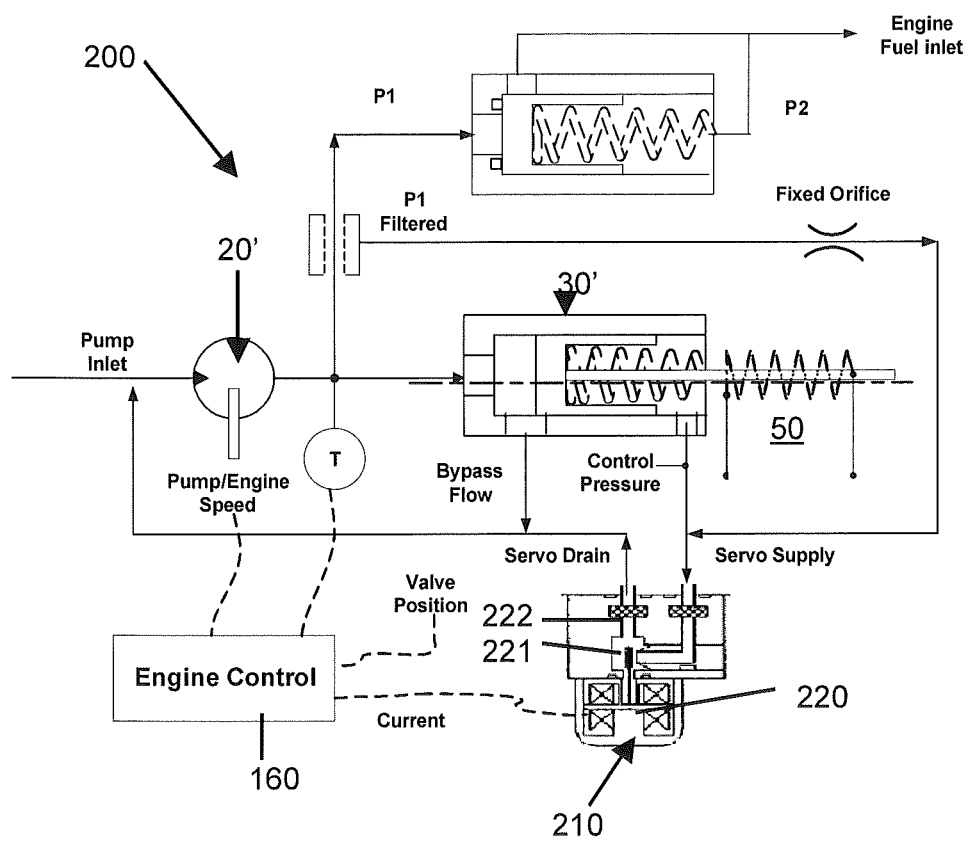
FIG. 3 is a schematic illustration of an engine fuel system with an MPSOV and a pressure regulating bypass valve which incorporates a pump capacity indicator and a pressure setting servo.

In accordance with further aspects of the invention and, with reference to FIG. 3, a fuel system 200 is provided and includes similar features as described above, which will not be described again, such as the engine controller 160 as well as a current to pressure (I/P) servo valve 210. The incorporation of this servo valve 210 as a servo pressure regulator permits the invention to be applied to applications with an engine driven fuel pump 20'. The commanded fuel flow here is achieved by servo control of the valve 30' (i.e., the bypass and pressure regulating valve, PRV).

The system 200 modulates fuel flow to the engine by changing the level of applied current to the servo pressure regulator. Movement from one fuel flow rate to a higher or lower fuel flow rate occurs by first applying a current to the coils of the torque motor 220 at a predetermined level to provide the desired pressure and fuel flow rate to the engine. A change in current causes a flapper 221 to move an amount proportional to the current. The flapper movement changes the flow area at the nozzle flapper interface which produces a proportionate change in servo flow. An increase in flow through the servo increases flow through the fixed orifice 222 which decreases the fluid pressure on the backside of the valve 30'. This in turn causes the pressure regulating valve (PRV) regulating spool to proportionally open and increase the pressure and fuel flow supplied to the engine. Fuel flow to the engine is reduced by closing the gap between the nozzle and flapper which increases the pressure on the backside of the valve 30' causing it to close.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An aircraft engine fuel system, comprising:
    a pump, including a pump inlet and a pump outlet, from which pressurized output is produced;
    a valve comprising a valve case defining an interior and a piston translatable within the interior, the valve being disposed downstream from the pump outlet and the valve case forming a valve inlet to receive a predefined portion of the output, a valve outlet to redirect a predefined portion of the output toward an engine and a bypass opening axially interposed between the valve inlet and the valve outlet;
    a bypass conduit, which is fluidly coupled at an inlet thereof to the bypass opening of the valve and at an outlet thereof to the pump inlet, by which a remaining portion of the output is able to be re-circulated to the pump inlet;
    a sensor coupled to a driveshaft of the piston of the valve and configured to ascertain axial translations of the piston from axial translations of the driveshaft and to issue a signal reflective of the axial translations of the piston at engine startup and maximum fuel flow conditions; and
    a controller, operably coupled to the pump and the sensor, which is receptive of the signal and which:
    compares the axial translations of the piston at the engine startup and maximum fuel flow conditions to determine whether changes in the axial translations of the piston are associated with decreased pump capacity due to wear, and
    controls the pump to modify performance models of the pump and engine to modify the output pressure in accordance with a determination that the changes in the axial translations of the piston are associated with the decreased pump capacity due to wear.

2. The aircraft engine fuel system according to claim 1, wherein the pump comprises a metering pump.

3. The aircraft engine fuel system according to claim 1, wherein the valve comprises a minimum pressure and shut off valve (MPSOV).

4. The aircraft engine fuel system according to claim 1, wherein the controller shuts off the pump when the valve is cracked.

* * * * *